United States Patent
Baick

(10) Patent No.: US 11,539,991 B2
(45) Date of Patent: Dec. 27, 2022

(54) METHOD AND SYSTEM FOR TRANSMITTING AND REPRODUCING VIDEO OF DYNAMIC BITRATE WITH A PLURALITY OF CHANNELS

(71) Applicant: LINE Plus Corporation, Seongnam-si (KR)

(72) Inventor: Joonsick Baick, Seongnam-si (KR)

(73) Assignee: LINE PLUS CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/101,436

(22) Filed: Nov. 23, 2020

(65) Prior Publication Data

US 2021/0076083 A1    Mar. 11, 2021

Related U.S. Application Data

(63) Continuation of application No. PCT/KR2018/005972, filed on May 25, 2018.

(51) Int. Cl.
| | |
|---|---|
| *H04N 21/2365* | (2011.01) |
| *H04N 19/184* | (2014.01) |
| *H04N 19/46* | (2014.01) |
| *H04N 19/70* | (2014.01) |
| *H04L 1/00* | (2006.01) |
| *H04N 21/2662* | (2011.01) |

(52) U.S. Cl.
CPC ....... *H04N 21/2365* (2013.01); *H04L 1/0071* (2013.01); *H04N 19/184* (2014.11); *H04N 19/46* (2014.11); *H04N 19/70* (2014.11); *H04N 21/2662* (2013.01)

(58) Field of Classification Search
None
See application file for complete search history.

(56) References Cited

U.S. PATENT DOCUMENTS

| | | | | |
|---|---|---|---|---|
| 5,793,425 | A * | 8/1998 | Balakrishnan | ..... H04N 21/2401 375/E7.157 |
| 9,591,318 | B2 * | 3/2017 | Lu | ......... H04N 19/39 |

(Continued)

FOREIGN PATENT DOCUMENTS

| | | | | |
|---|---|---|---|---|
| CN | 107517384 | A * | 12/2017 | .......... H03M 7/4018 |
| CN | 108141605 | A * | 6/2018 | .......... H04N 19/105 |

(Continued)

OTHER PUBLICATIONS

JP Office Action dated Jun. 14, 2022 for corresponding Japanese Patent Application No. 2020-565949.

(Continued)

*Primary Examiner* — Reza Aghevli
(74) *Attorney, Agent, or Firm* — Harness, Dickey & Pierce, P.L.C.

(57) ABSTRACT

Disclosed is a method and system for transmitting and reproducing a video of a dynamic bitrate using a plurality of channels. A video transmission method may transferring frames of a video to N encoders using an interleaving scheme, N denoting a first natural number greater than or equal to 2, generating N video streams by encoding the frames using the N encoders, each of the N video streams corresponding to one of the N encoders, and transmitting each of the N video streams as an independent stream.

20 Claims, 9 Drawing Sheets

(56) References Cited

U.S. PATENT DOCUMENTS

| | | | |
|---|---|---|---|
| 9,769,485 B2 * | 9/2017 | Lu | H04N 19/30 |
| 10,652,625 B1 * | 5/2020 | Saxton | H04N 21/8547 |
| 2003/0039308 A1 * | 2/2003 | Wu | H04N 19/172 |
| | | | 375/E7.193 |
| 2013/0070859 A1 | 3/2013 | Lu et al. | |
| 2014/0307805 A1 * | 10/2014 | Ihara | H04N 19/42 |
| | | | 375/240.26 |
| 2015/0281752 A1 * | 10/2015 | Van Veldhuisen | H04N 21/233 |
| | | | 725/116 |

FOREIGN PATENT DOCUMENTS

| | | | |
|---|---|---|---|
| JP | H10108175 A | 1/1998 | |
| JP | H11234644 A | 8/1999 | |
| JP | 3621598 B2 * | 2/2005 | H04N 19/105 |
| JP | 2007-143142 A | 6/2007 | |
| JP | 2009-171614 A | 7/2009 | |
| JP | 2009-543424 A | 12/2009 | |
| JP | 2014-086770 A | 5/2014 | |
| JP | 2014-207498 A | 10/2014 | |
| JP | 2017-098796 A | 6/2017 | |
| KR | 10-2004-0030131 A | 4/2004 | |
| KR | 10-2007-0048095 A | 5/2007 | |
| KR | 100746013 B1 | 8/2007 | |
| KR | 10-2009-0024106 A | 3/2009 | |
| KR | 10-2009-0081617 A | 7/2009 | |
| KR | 10-2014-0027982 A | 3/2014 | |
| WO | WO-2015/133249 A1 | 9/2015 | |
| WO | WO-2017/094318 A1 | 6/2017 | |
| WO | WO-2017114821 A1 * | 7/2017 | H04N 19/39 |

OTHER PUBLICATIONS

Korean Office Action dated Aug. 30, 2022 by the Korean Patent Office corresponding to Korean patent application No. 10-2020-7028833.

* cited by examiner

METHOD AND SYSTEM FOR TRANSMITTING AND REPRODUCING VIDEO OF DYNAMIC BITRATE WITH A PLURALITY OF CHANNELS

CROSS-REFERENCE TO RELATED APPLICATIONS

This application is a continuation application of, and claims priority from International Application PCT/KR2018/005972, which has an International filing date of May 25, 2018, the disclosure of which is incorporated herein by reference in its entirety.

TECHNICAL FIELD

At least one example embodiment relates to a method and system for transmitting and reproducing a video of a dynamic bitrate using a plurality of channels.

RELATED ART

There is technology in which a server receives a video provided from a broadcast sender and the server transmits the received video to a plurality of broadcast receivers. Here, to provide a video of a single quality (e.g., resolution) provided from the broadcast sender in various qualities according to the usage of broadcast receivers, the server performs a transcoding process. For example, a case in which a broadcast sender transmits a video at a resolution of 720p may be considered. Here, in 720p, the number "720" denotes 720 lines of vertical resolution and the character "p" denotes progressive scanning. Therefore, 720p may represent a high-definition (HD) image with a resolution of 1280×720. Here, if the server is to support transmission of a video using a total of three quality resolutions, 720p, 480p, and 360p, for broadcast viewers, the server transcodes a video transmitted at a resolution of 720p from a broadcast sender to three videos of 720p, 480p, and 360p. For example, technology exists for transcoding a digital broadcast stream received from an outside source for retransmission.

However, such transcoding consumes a great amount of server resources. For example, with respect to a video of a broadcast sender, transcoding the video further consumes hundreds of times more server resources (e.g., power, processor time and/or cycles, memory, etc.) compared to simply multiplexing or muxing frames. Therefore, performing transcoding to provide a video with various qualities to broadcast receivers consumes a great amount of resources on the server side.

Alternatively, when the server does not perform transcoding to reduce server infrastructure cost, broadcast receivers may view a corresponding broadcast only after receiving data corresponding to a bitrate of a broadcast transmitted from a broadcast sender. For example, in a poor network environment, the broadcast sender may adjust the restrictions of broadcast transmission to some extent by dynamically adjusting a broadcast bitrate. In contrast, regardless of a network environment, broadcast receivers may view a corresponding broadcast only after receiving all of data corresponding to a bitrate of a broadcast transmitted from a broadcast sender. Therefore, to view a broadcast without restriction, the same or higher network quality than the network quality used by a broadcast sender is used.

SUMMARY

At least one example embodiment provides a video transmission method that may divide and thereby transmit a single video using N channels instead of using a single channel (here, N denotes a natural number greater than or equal to 2), a computer apparatus for performing the video transmission method, and a non-transitory computer-readable record medium storing computer-readable instructions that, when executed by processing circuitry (e.g., a processor), cause the processing circuitry to perform the video transmission method.

At least one example embodiment also provides a video reproduction method that may reproduce a video of a bitrate suitable for a network environment of a receiver side in such a manner that a receiver may combine and reproduce video streams received through n channels among N channels transmitted from a transmitter based on the network environment (here, n denotes a natural number less than or equal to N), a computer apparatus for performing the video reproduction method, and a non-transitory computer-readable record medium storing computer-readable instructions that, when executed by processing circuitry (e.g., a processor), cause the processing circuitry to perform the video reproduction method.

According to an aspect of at least one example embodiment, there is provided a video transmission method including transferring frames of a video to N encoders using an interleaving scheme, N denoting a first natural number greater than or equal to 2, generating N video streams by encoding the frames using the N encoders, each of the N video streams corresponding to one of the N encoders, and transmitting each of the N video streams as an independent stream.

According to an aspect of at least one example embodiment, there is provided a non-transitory computer-readable record medium storing instructions that, when executed by processing circuitry (e.g., a processor), cause the processing circuitry to implement the video transmission method.

According to an aspect of at least one example embodiment, there is provided a video reproduction method including implementing N decoders, N denoting a first natural number greater than or equal to 2, selecting n video streams from among N video streams, frames of a single video being distributed among the N video streams based on an interleaving scheme, n denoting a second natural number less than or equal to N, decoding the n video streams using n decoders among the N decoders to obtain n decoded video streams, and reproducing the single video using the n decoded video streams; and reproducing a video using the n video streams decoded through the n decoders.

According to an aspect of at least one example embodiment, there is provided a non-transitory computer-readable record medium storing instructions that, when executed by processing circuitry (e.g., a processor), cause the processing circuitry to implement the video reproduction method.

According to an aspect of at least one example embodiment, there is provided a computer apparatus including processing circuitry (e.g., at least one processor configured to execute computer-readable instructions). The processing circuitry is configured to transfer frames of a video to N encoders using an interleaving scheme, N denoting a first natural number greater than or equal to 2, generate N video streams by encoding the frames using the N encoders, each of the N video streams corresponding to one of the N encoders, and transmit each of the N video streams as an independent stream.

According to an aspect of at least one example embodiment, there is provided a computer apparatus including processing circuitry (e.g., at least one processor configured to execute computer-readable instructions). The processing circuitry is configured to implement N decoders, N denoting a first natural number greater than or equal to 2, select n video streams from among N video streams, frames of a single video being distributed among the N video streams based on an interleaving scheme, n denoting a second natural number less than or equal to N, decode the n video streams using n decoders among the N decoders to obtain n decoded video streams; and reproduce the single video using the n decoded video streams.

According to at least one example embodiment, a sender may divide and thereby transmit a single video using N channels instead of using a single channel. Here, N denotes a natural number greater or equal to 2.

According to at least one example embodiment, a receiver may reproduce a video of a bitrate suitable for a network environment of a receiver side by combining and thereby reproducing video streams received through n channels among N channels transmitted from a sender based on the network environment. Here, n denotes a natural number less than or equal to N.

Further areas of applicability will become apparent from the description provided herein. The description and specific examples in this summary are intended for purposes of illustration only and are not intended to limit the scope of the present disclosure.

DETAILED DESCRIPTION

Figure 1:
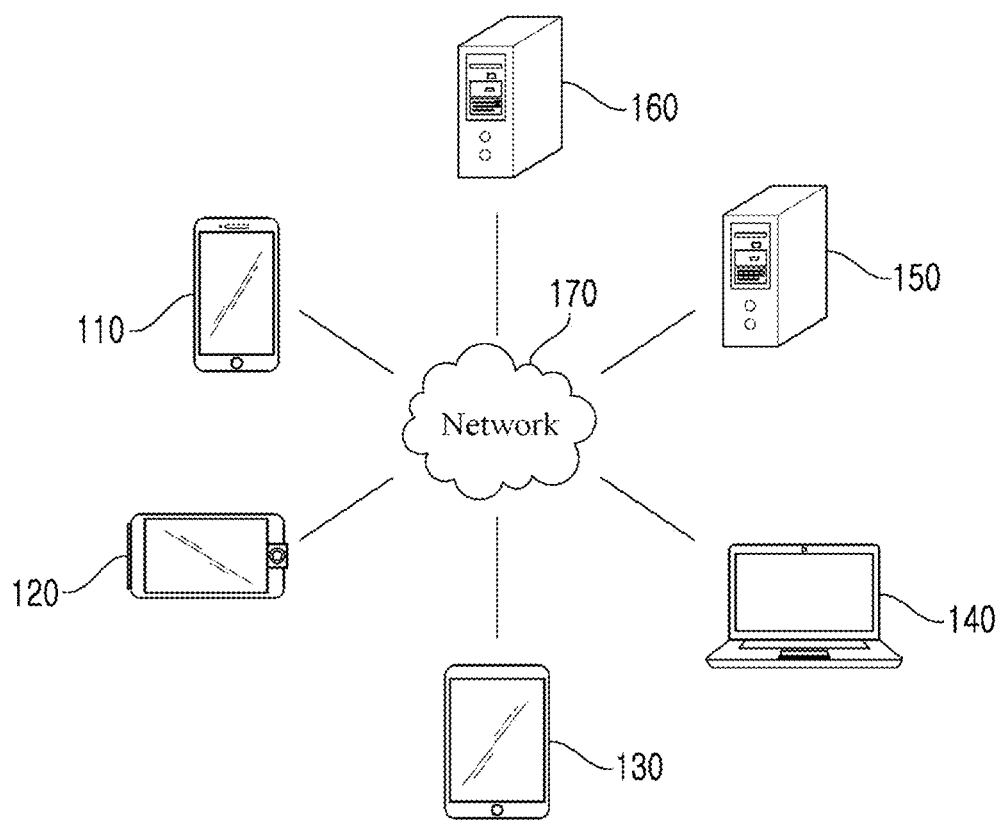
FIG. 1 is a diagram illustrating an example of a network environment according to at least one example embodiment.

At least one example embodiment will be described in detail with reference to the accompanying drawings. At least one example embodiment, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to at least one example embodiment. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which at least one example embodiment belongs. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned below. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, at least one example embodiment may be exemplified as one computer processing device; however, one skilled in the art will appreciate that a hardware device may include multiple processing elements and multiple types of processing elements. For example, a hardware device may include multiple processors, or a processor and a controller. In addition, other processing configurations are possible, such as parallel processors.

Although described with reference to specific examples and drawings, modifications, additions and substitutions of at least one example embodiment may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, at least one example embodiment will be described with reference to the accompanying drawings.

A video transmission method according to at least one example embodiment may be performed through a computer apparatus, such as the following electronic device. Here, a computer program according to at least one example embodiment may be installed and executed on the computer apparatus and the computer apparatus may perform the video transmission method under control of the executed computer program. The computer program may be stored in a non-transitory computer-readable record medium to implement the video transmission method on a computer in conjunction with the computer apparatus. Also, a video reproduction method according to at least one example embodiment may be performed through a computer apparatus, such as the following electronic device. Here, a computer program according to at least one example embodiment may be installed and executed on the computer apparatus and the computer apparatus may perform the video reproduction method according to at least one example embodiment under control of the executed computer program.

FIG. 1 illustrates an example of a network environment according to at least one example embodiment. Referring to FIG. 1, the network environment may include a plurality of electronic devices 110, 120, 130, and/or 140, a plurality of servers 150 and/or 160, and/or a network 170. FIG. 1 is provided as an example only. A number of electronic devices or a number of servers is not limited thereto.

Each of the plurality of electronic devices 110, 120, 130, and/or 140 may be a fixed terminal or a mobile terminal that is configured as a computer apparatus. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), and/or the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a single computer apparatus or at least two computer apparatuses that provide an instruction, a code, a file, content, a service, etc., through communication with the plurality of electronic devices 110, 120, 130, and/or 140 over the network 170. For example, the server 150 may be a system that provides a first service to the plurality of electronic devices 110, 120, 130, and/or 140 connected over the network 170, and the server 160 may be a system that provides a second service to the plurality of electronic devices 110, 120, 130, and/or 140 connected over the network 170. In detail, for example, the first service may be a social network service (SNS). In this case, the server 150 may provide the plurality of electronic devices 110, 120, 130, and/or 140 on which an application linked to a service is installed with various services providable as an SNS, such as a broadcast transmission service, a messaging service, and a timeline service, through the application. Also, the server 160 may provide an installation file for installation of the application to the plurality of electronic devices 110, 120, 130, and/or 140 as the second device.

Figure 2:
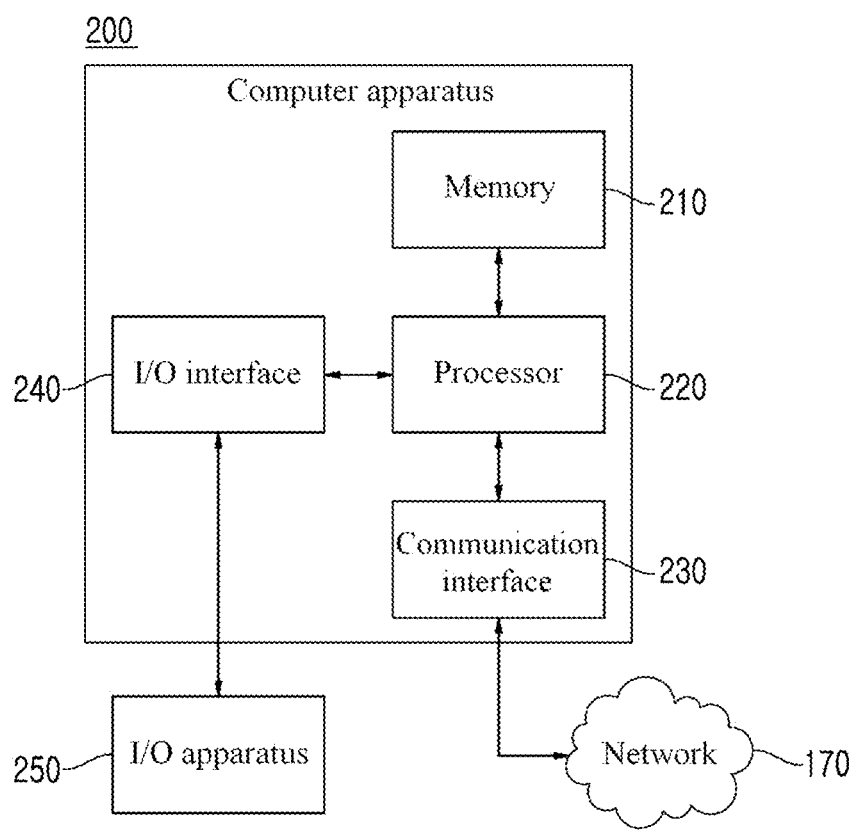
FIG. 2 is a diagram illustrating an example of an electronic device and a server according to at least one example embodiment.

FIG. 2 is a block diagram illustrating an example of a computer apparatus according to at least one example embodiment. Each of the plurality of electronic devices 110, 120, 130, and/or 140 or each of the servers 150 and/or 160 may be implemented by a computer apparatus 200 of FIG. 2. For example, a computer program according to at least one example embodiment may be installed and executed on the computer apparatus 200, and the computer apparatus 200 may perform a video transmission method and/or a video reproduction method according to at least one example embodiment under control of the executed computer program.

Referring to FIG. 2, the computer apparatus 200 may include a memory 210, a processor 220, a communication interface 230, and/or an input/output (I/O) interface 240. The memory 210 may include a permanent mass storage device, such as a random access memory (RAM), a read only memory (ROM), and/or a disk drive, as a non-transitory computer-readable storage medium. The permanent mass storage device, such as the ROM and disk drive, may be included in the computer apparatus 200 as a permanent storage device separate from the memory 210. Also, an OS and at least one program code may be stored in the memory 210. The software components may be loaded to the memory 210 from another non-transitory computer-readable medium separate from the memory 210. The other non-transitory computer-readable storage medium may include a non-transitory computer-readable storage medium, for example, a floppy drive, a disk, a tape, a DVD/CD-ROM drive, a memory card, etc. According to at least one example embodiment, software components may be loaded to the memory 210 through the communication interface 230 instead of, or in addition to, the non-transitory computer-readable storage medium. For example, software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices, over the network 170. For example, the processor 220 of the electronic apparatus 200 may transfer data, a file, a request or an instruction created based on the program code stored in the storage device, such as the memory 210, to other apparatuses over the network 170 under control of the communication interface 230. Inversely, a signal, an instruction, data, a file, etc., from the other apparatus may be received at the computer apparatus 200 through the communication interface 230 of the computer apparatus 200 by going through the network 170. For example, a signal, an instruction, data, etc., received through the communication interface 230 may be transferred to the processor 220 or the memory 210, and a file, etc., may be stored in a storage medium, for example, the permanent mass storage device, further includable in the computer apparatus 200.

The I/O interface 240 may be a device used for interface with an I/O apparatus 250 (e.g., an input device and/or an output device). For example, an input device may include a device, such as a microphone, a keyboard, a mouse, and the like, and an output device may include a device, such as a display, a speaker, and the like. As another example, the I/O interface 240 may be a device for interface with an apparatus in which an input function and an output function are integrated into a single function, such as a touchscreen. At least one I/O apparatus 250 may be configured as a single apparatus with the computer apparatus 200.

According to at least one example embodiment, the computer apparatus 200 may include a number of components greater than or less than a number of components shown in FIG. 2. However, some conventional components are not illustrated in detail. For example, the computer apparatus 200 may be configured to include at least a portion of the I/O apparatus 250 or may further include other components, such as, a transceiver and a database.

Figure 3:
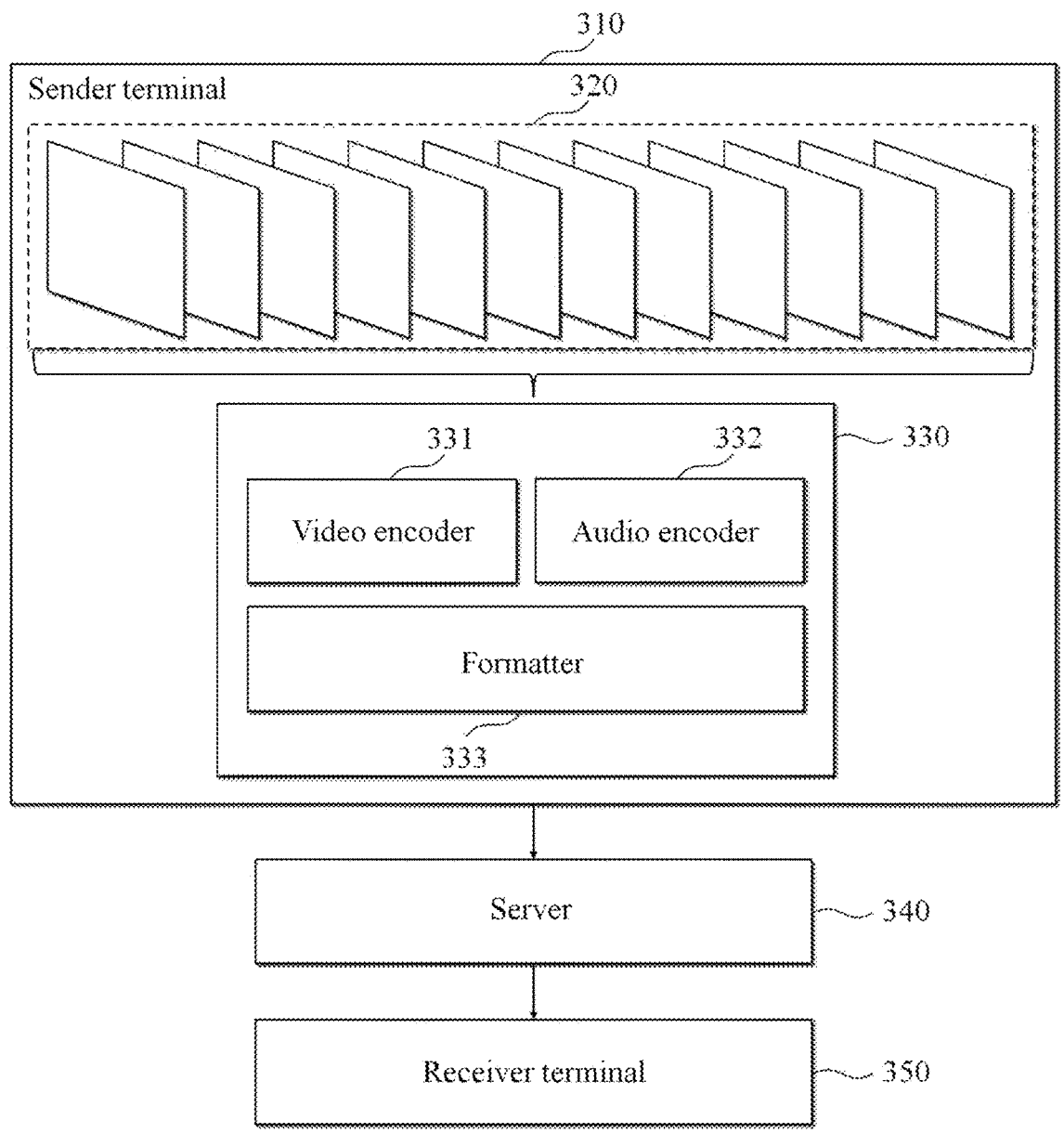
FIG. 3 illustrates an example of a video transmission process according to the related art.
Figure 4:
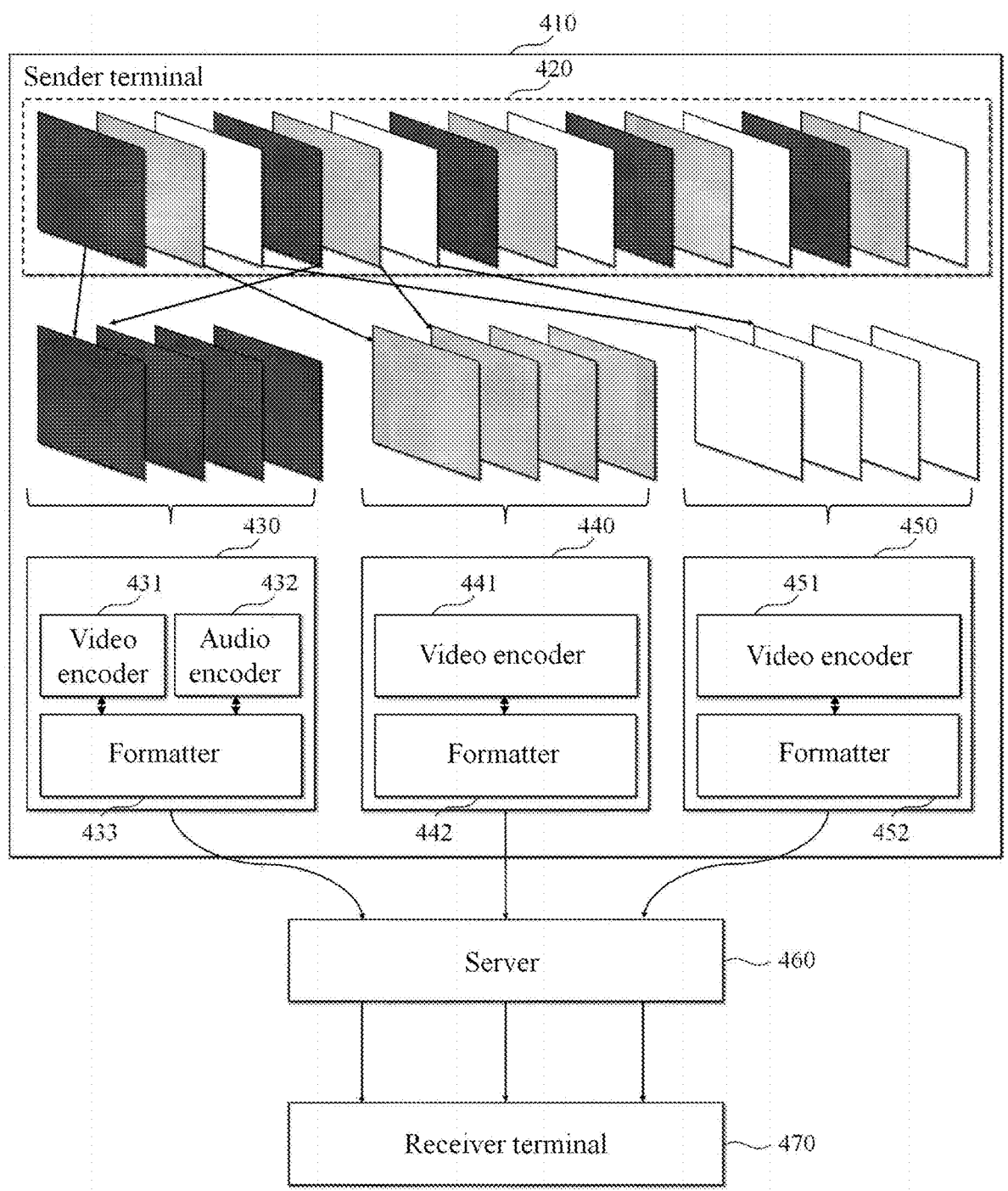
FIG. 4 illustrates an example of a video transmission process according to at least one example embodiment.

FIG. 3 illustrates an example of a video transmission process according to the related art, and FIG. 4 illustrates an example of a video transmission process according to at least one example embodiment.

FIG. 3 illustrates an example in which a sender terminal 310 encodes frames 320 of a video through an encoder 330, and transmits the encoded frames 320 of the video to a receiver terminal 350 through a server 340. Here, the sender terminal 310 according to the related art simply encodes the frames 320 of the video through the encoder 330 in a sequential manner. Here, a video encoder 331 may encode the frames 320 of the video and an audio encoder 332 may encode an audio included in the video. Also, a formatter 330 may convert the encoded video and audio to a format suitable for a video streaming protocol, for example, a real-time messaging protocol (RTMP), preset or alternatively, given for the server 340. The receiver terminal 350 may reproduce the video by decoding encoded data transferred through the server 340 using a decoder. Here, the receiver terminal 350 according to the related art may reproduce the video only after receiving data of a bitrate set by the sender terminal 310.

Referring to FIG. 4, a sender terminal 410 according to at least one example embodiment may implement (e.g., generate and/or operate) N encoders and may divide and encode frames 420 for a single video through N encoders in in an interleaving manner. Here, N denotes a natural number greater than or equal to 2. For example, FIG. 4 illustrates an example in which N=3, that is, an example in which three encoders, a first encoder 430, a second encoder 440, and a third encoder 450, are implemented. Each of the first encoder 430, the second encoder 440, and the third encoder 450 may be implemented in the form of a software module under control of a computer program that is installed and executed on the sender terminal 410.

If N=4, four encoders may be implemented. N corresponding to a number of encoders may vary based on a network situation of the sender terminal 410. For example, a level of the network situation may be determined according to parameters such as the number of packet retransmissions, transmission power, forward error correction (FEC) rate, maximum allowable buffer latency information of packets, and transmission delay (jitter) between packets. In this case, the better the network situation, the higher the level may be set. For example, the smaller the jitter, the higher the level may be set. Also, the higher the grade, the larger the value of N may be.

Here, an i-th frame may be transferred to an (((i−1) mod N)+1)-th encoder. Here, i denotes a natural number. For example, if N=3, a fourth frame may be transferred to the first encoder 430 through ((4−1) mod 3)+1) and a fifth frame may be transferred to the second encoder 440 through (((5−1) mod 3)+1).

According to at least one example embodiment, the first encoder 430 may include a video encoder 431, an audio encoder 432 and/or a formatter 433. In this case, the first encoder 430 may encode transferred video frames through (e.g., using) the video encoder 431 and may further encode an audio of a corresponding video through the audio encoder 432. The audio may not be further divided for encoding, which differs from the video frames which may be further divided as discussed below. Therefore, the audio may be included in (e.g., transferred to) the first encoder 430 that is a main encoder. Next, the first encoder 430 may perform streaming by converting the encoded video and audio to a format suitable for a video streaming protocol, for example, an RTMP, which is preset or alternatively, given for a server 460, through (e.g., using) the formatter 433.

According to at least one example embodiment, the second encoder 440 may include a video encoder 441 and/or a formatter 442, and the third encoder 450 may include a video encoder 451 and/or a formatter 452. Referring to FIG. 4, N−1 sub encoders, for example, the second encoder 440 and the third encoder 450 may encode video frames transferred thereto by including the video encoders 441 and 451, and the formatters 442 and 452, respectively, without including a separate audio encoder and/or without performing audio encoding. The second encoder 440 and the third encoder 450 may convert a video encoded through (e.g., using) the video encoders 441 and 451 to a format suitable for a video streaming protocol, for example, an RTMP, preset or alternatively, given for the server 460, through (e.g., using) the formatters 442 and 452, respectively.

In this case, the server 460 may receive N video streams through N channels for a single video and may transfer the N video streams through the N channels.

Meanwhile, a receiver terminal 470 may reproduce the video by receiving only desired n video streams based on a situation of the receiver terminal 470 without receiving all of the N video streams through the N channels. Here, n denotes a natural number less than or equal to N. Here, if n is relatively smaller than N, the quality of the video may be degraded, however, the video may be reproduced stably even in a poor quality network situation. A value of n may also be determined according to the level of the network situation. On the contrary, if the network situation becomes better, n may be selected to be equal or close to N. In this case, the quality of the video may be relatively enhanced. If n=N, the video may be reproduced at a bitrate transmitted by the sender terminal 410. Dissimilar to the related art in which the receiver terminal 350 reproduces a video of a bitrate set by the sender terminal 310 at all times, the receiver terminal 470 according to at least one example embodiment may reproduce a video of a desired bitrate based on a network situation, which may lead to reducing the restrictions according to the network situation. For example, in a poor network situation, the receiver terminal 470 may reproduce a video based on data that is encoded and streamed through the first encoder 430 that is a main encoder. Also, as the network situation improves, the receiver terminal 470 may reproduce the video by further using data encoded and streamed through the second encoder 440 and/or the third encoder 450 that are sub encoders.

Each of the sender terminal 410 and the receiver terminal 470 may be, for example, one of the plurality of electronic devices 110, 120, 130, and/or 140, and may be implemented by the computer apparatus 200 of FIG. 2. Also, the server 460 may be one of the servers 150 and/or 160 and may be implemented by the computer apparatus 200 of FIG. 2.

Figure 5:
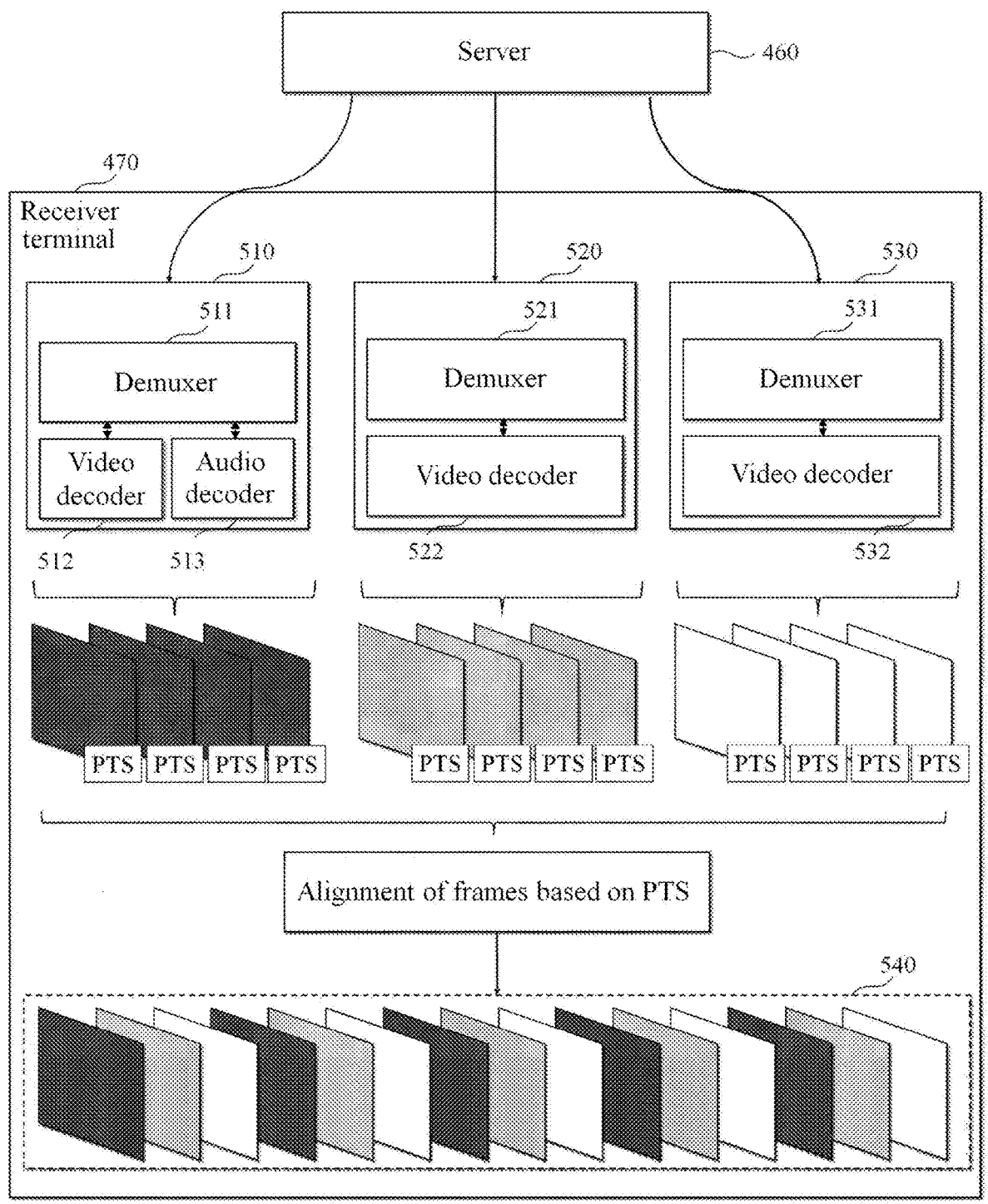
FIG. 5 illustrates an example of a video reproduction process according to at least one example embodiment.

FIG. 5 illustrates an example of a video reproduction process according to at least one example embodiment. FIG. 5 illustrates an example in which the receiver terminal 470 reproduces a video by receiving all of N video streams from the server 460. Here, data encoded and streamed through the first encoder 430 that is a main encoder may be decoded through a first decoder 510 that is a main decoder. Also, data encoded and streamed through the second encoder 440 and the third encoder 450 that are sub encoders may be decoded through a second decoder 520 and a third decoder 530 that are sub decoders, respectively.

For example, the sender terminal 410 may implement N encoders and may transmit a value of N to the receiver terminal 470 through the server 460. The receiver terminal 470 may receive the value of N through the server 460 and may implement (e.g., generate and/or operate) N decoders, accordingly. FIG. 5 illustrates at least one example embodiment in which, as three encoders, for example, the first encoder 430, the second encoder 440, and the third encoder 450, are implemented, the sender terminal 410 transfers '3' as the value of N through the server 460 and the receiver terminal 470 implements three decoders, for example, a first decoder 510, a second decoder 520, and a third decoder 530, based on '3' that is the received value of N.

According to at least one example embodiment, the first decoder 510 includes a demultiplexer 511, a video decoder 512 and/or an audio decoder 513. According to at least one example embodiment, the second decoder 520 includes a demultiplexer 521 and/or a video decoder 522, and the third decoder 530 includes a demultiplexer 531 and/or a video decoder 532. Each of the demultiplexers (demuxers) 511, 521, and 531 may provide a function of reading and processing a video file (e.g., a specific video file), and the video decoders 512, 522, and 523 may decode encoded frames. The first decoder 510 that is a main decoder may further include the audio decoder 513 configured to decode audio.

The frames decoded by each of the three decoders, for example, the first decoder 510, the second decoder 520, and/or the third decoder 530, may include presentation timestamp (PTS) information and/or an indication of the PTS, and the receiver terminal 470 may acquire combined frames 540 of the video for reproduction by aligning and combining the frames decoded by the three decoders, for example, the first decoder 510, the second decoder 520, and the third decoder 530, based on the PTS. The PTS may refer to information about a desired time for displaying a corresponding frame on a screen and may refer to information that is added to the corresponding frame (e.g., by the sender terminal 410), and thereby transferred, when the sender terminal 410 encodes the frame. Alignment of frames may be performed within a frame buffer. Here, the combined frames 540 may be identical or similar to the frames 420 of the video (e.g., an entirety of the video) transmitted from the sender terminal 410.

Figure 6:
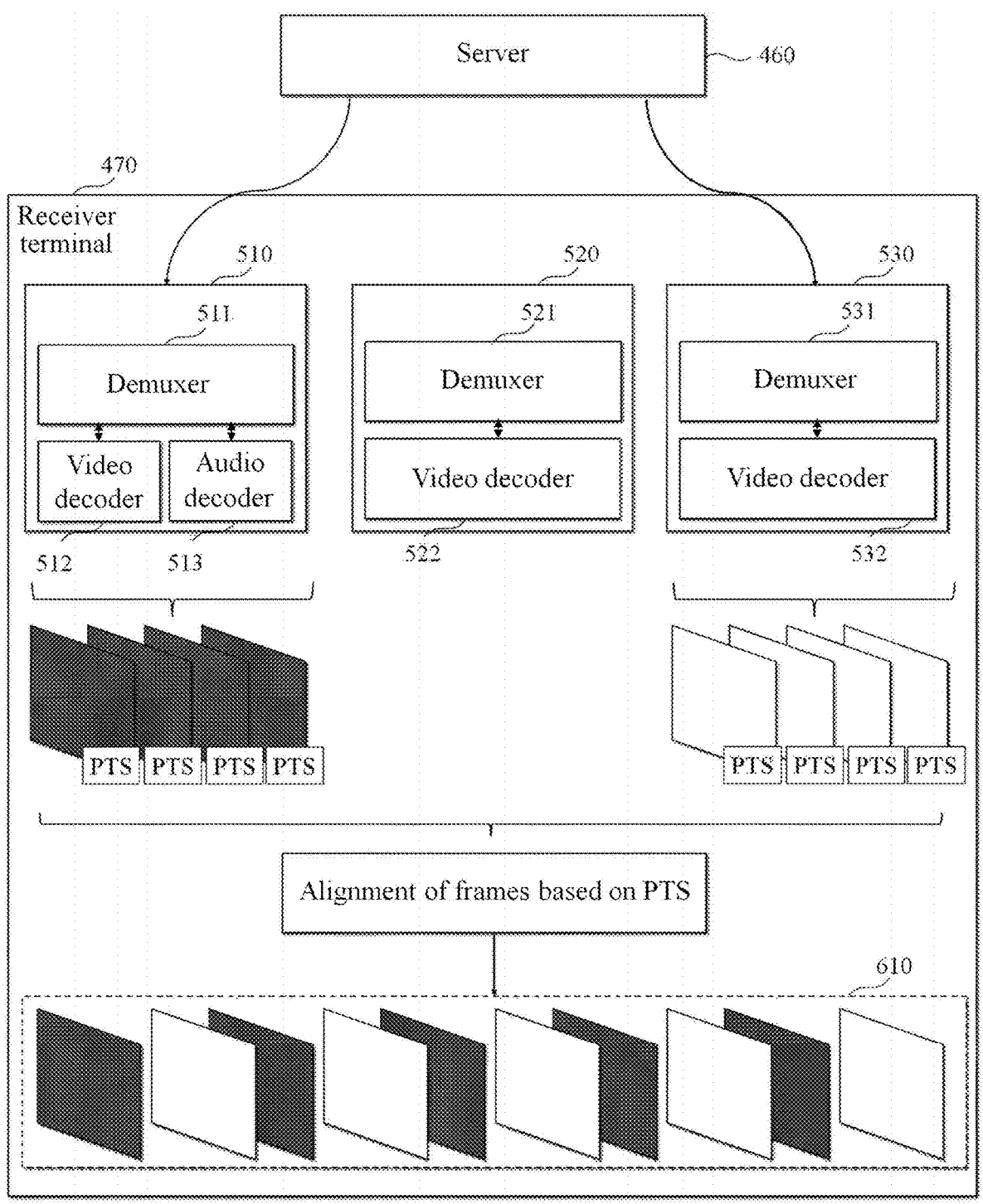
FIG. 6 illustrates another example of a video reproduction process according to at least one example embodiment.

FIG. 6 illustrates another example of a video reproduction process according to at least one example embodiment. FIG. 6 illustrates an example of a process of reproducing a video using only a portion of the N video streams if the receiver terminal 470 is in a poor network situation. For example, referring to FIG. 6, the receiver terminal 470 may determine a value of n based on a network situation. Here, n is determined as '2.' For audio decoding, data encoded and streamed through the first encoder 430 that is a main encoder may be decoded through the first decoder 510 that is a main decoder, and a single channel may be selected (e.g., arbitrarily selected) from among channels of data encoded and streamed through the second encoder 440 and the third encoder 450 that are sub encoders. FIG. 6 illustrates an example of receiving and decoding a video stream through a channel of data encoded and streamed through the third encoder 450. Here, the third decoder 530 may decode the video stream that is received through the corresponding channel.

Here, similar to FIG. 5, the receiver terminal 470 may align and combine frames decoded through the first decoder 510 and frames decoded through the third decoder 530 based on PTS and may reproduce a video through combined frames 610. The combined frames 610 of FIG. 6 may have a lower bitrate than that of the combined frames 540 of FIG. 5. Accordingly, even in a relatively poor network situation, the video may be further stably reproduced.

Figure 7:
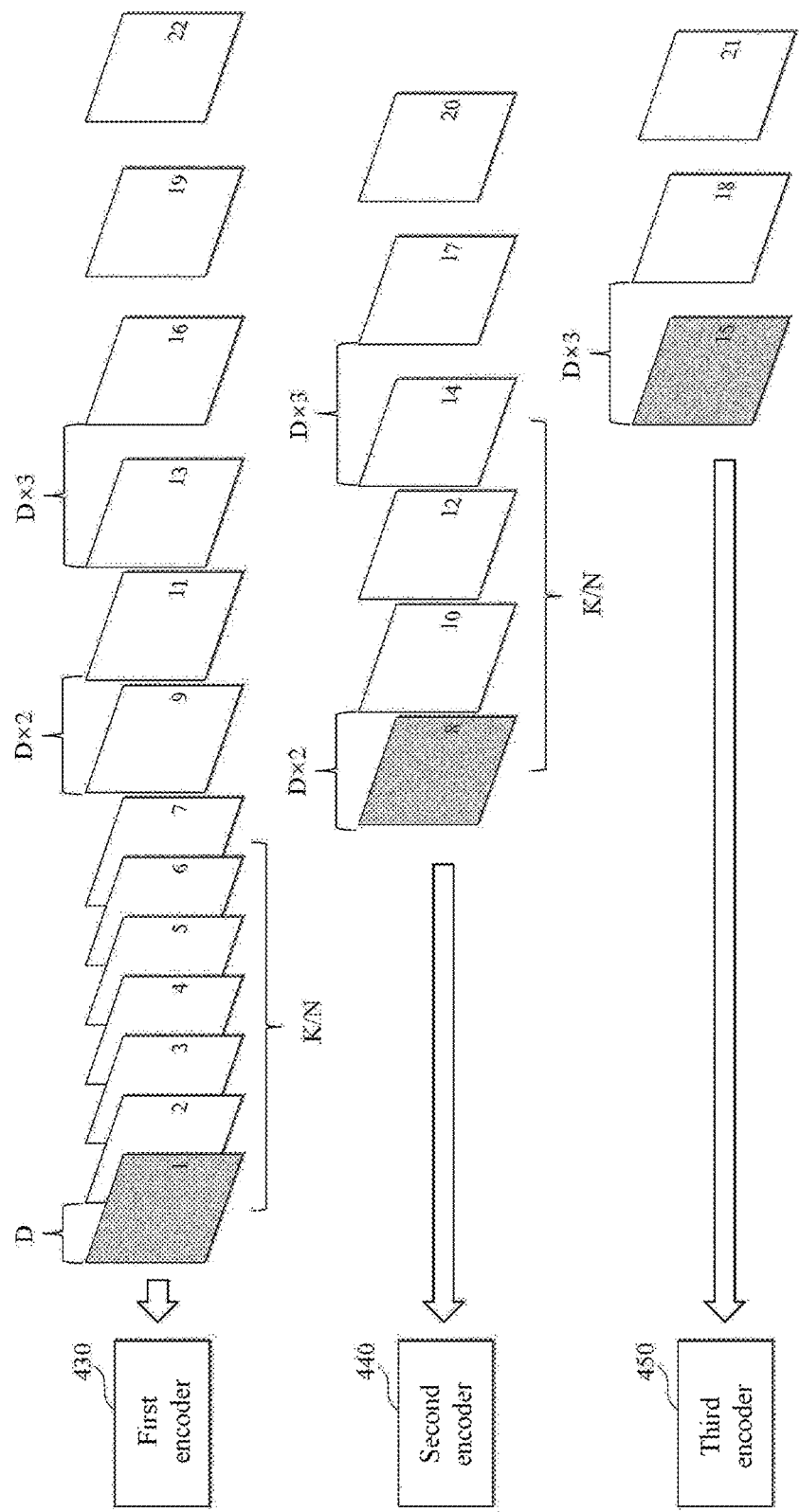
FIG. 7 illustrates an example of sequentially activating encoders according to at least one example embodiment.

FIG. 7 illustrates an example of sequentially activating encoders according to at least one example embodiment. To maintain a number of key frames to be the same or similar, the sender terminal 410 may set a key frame period of each of the N encoders to be N times a key frame period used in the case of using a single encoder. A key frame refers to an independently encoded frame and is an independently decodable frame that without referring to another frame. Other frames may be encoded and/or decoded by referring to the key frame and/or other frames. Therefore, since it is undesirable to increase a number of key frames, the sender terminal 410 may set a key frame period of each of the N encoders to be N times of a key frame period in the case of using a single encoder. As the key frame period increases N times, the frame period "D" may also increase N times. In FIG. 3, N=3. Therefore, if a key frame period in the case of using a single encoder is k, a key frame period of each of the first encoder 430, the second encoder 440, and the third encoder 450 in the example depicted in FIG. 7 may be set to 3 k (hereinafter, 'K'). Therefore, the frame period may also be increased to 3D. Here, the first encoder 430, the second encoder 440, and the third encoder 450 may be sequentially activated every K/N to prevent key frames from being simultaneously or contemporaneously generated or to reduce the occurrence thereof. An initial frame in the respective frames is generated as a key frame. Therefore, if N encoders are simultaneously or contemporaneously activated, three key frames are generated simultaneously or contemporaneously at the same time, or at a similar time, each time (e.g., each key frame period). Therefore, to distribute this, a point in time at which the key frames are generated may be maximally distributed, or more distributed, by sequentially activating the N encoders every K/N, for example, K/3 in the example depicted in FIG. 7. That is, the sender terminal 410 may activate only a main encoder and may sequentially activate the remaining N-1 sub encoders based on a period (K/N) corresponding to a ratio of a key frame period (K) to N.

Figure 8:
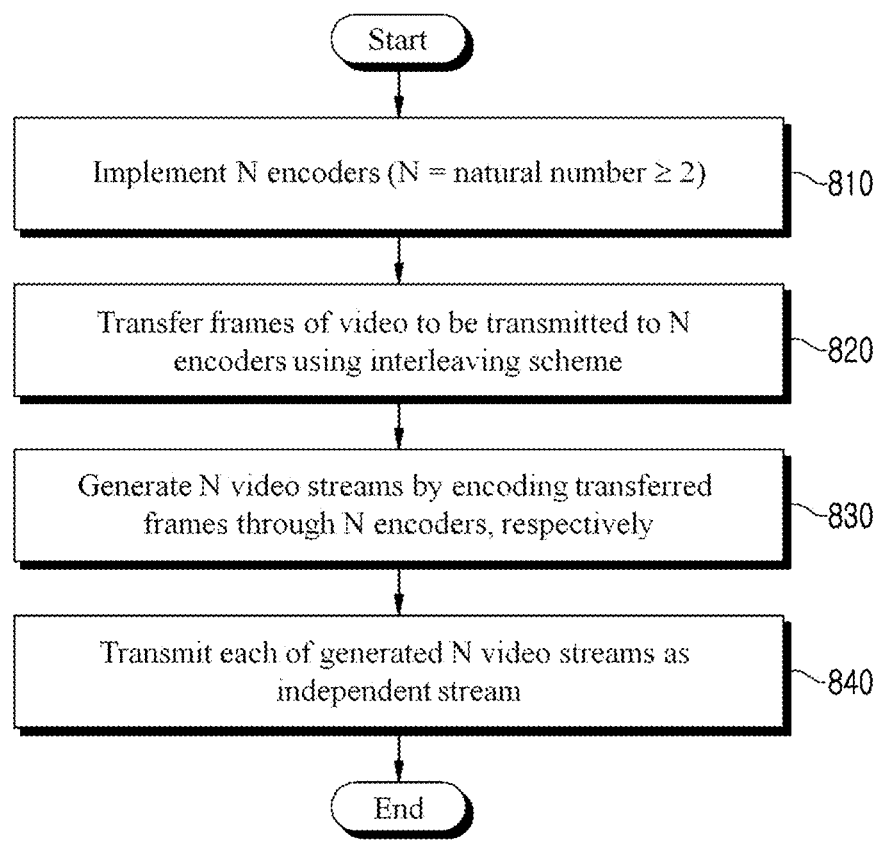
FIG. 8 is a flowchart illustrating an example of a video transmission method according to at least one example embodiment.

FIG. 8 is a flowchart illustrating an example of a video transmission method according to at least one example embodiment. The video transmission method according to at least one example embodiment may be performed by the computer apparatus 200 that implements the sender terminal 410. For example, the processor 220 of the computer apparatus 200 may be configured to execute a control instruction according to a code of at least one program or a code of an OS included in the memory 210. For example, the program code may be a code of an application installed on the sender terminal 410 for linkage to a service for video transmission. Here, the processor 220 may control the computer apparatus 200 to perform operations 810 to 840 included in the video transmission method of FIG. 8 in response to a control instruction provided from a code stored in the computer apparatus 200.

Referring to FIG. 8, in operation 810, the computer apparatus 200 may implement N encoders. N denotes a natural number greater than or equal to 2. Here, N may be preset or alternatively, given, and may be arbitrarily selected and/or adjusted by the computer apparatus 200 based on a network environment. Each of the N encoders may be implemented in the form of a software module under control of an application installed and executed on the computer apparatus 200. Here, the computer apparatus 200 may include a single main encoder configured to encode a video and an audio, by including a video encoder and an audio encoder, and N-1 sub encoders configured to encode a video by including a video encoder. Here, to prevent an increase in a number of key frames or reduce the amount of the increase, the computer apparatus 200 may set a key frame period of each of the N encoders to be N times a key frame period used in the case of using a single encoder. An example of setting, as a key frame generation period for each of the N encoders, k*N (period K) that is N times of a key frame period k in the case of using a single encoder is described above with reference to FIG. 7.

In operation 820, the computer apparatus 200 may transfer frames of a video to be transmitted to the N encoders using an interleaving scheme. For example, the computer apparatus 200 may transfer an i-th frame of the video to an (((i−1) mod N)+1)-th encoder. Here, i denotes a natural number. As described above with reference to FIG. 7, if the N encoders are sequentially activated, initial transfer order of frames may vary. For example, if N=3, the i-th frame may be transferred to the (((i−1) mod N)+1)-th encoder with respect to frames after a third encoder is active. Here, the computer apparatus 200 may sequentially activate the N encoders based on a period (K/N) corresponding to a ratio of a key frame period to N.

In operation 830, the computer apparatus 200 may generate N video streams by encoding the transferred frames through the N encoders, respectively. As described above, the main encoder may encode each of the video frames and an audio transferred to the main encoder, and each of the N-1 sub encoders may encode video frames transferred thereto. Here, a total of N video streams may be generated from the N encoders, respectively.

In operation 840, the computer apparatus 200 may transmit each of the generated N video streams as an independent stream. For example, the sender terminal 410, that is, the computer apparatus 200 may transmit each of the generated N video streams to the receiver terminal 470 as an independent stream through the server 460. Meanwhile, the sender terminal 410, that is, the computer apparatus 200 may further transmit a value of N to the receiver terminal 470 through the server 460 such that the receiver terminal 470 may decode each of up to N video streams.

Here, the receiver terminal 470 may select n that is a number of video streams used for reproduction of the video based on a network situation and may reproduce the video by decoding n video streams selected from among the N video streams independently transmitted from the sender terminal 410 to the server 460. Here, n denotes a natural number less than or equal to N. Also, the receiver terminal 470 may dynamically adjust a number of video streams decoded for reproduction of the video by dynamically changing a value of n in response to a change in the network situation.

Figure 9:
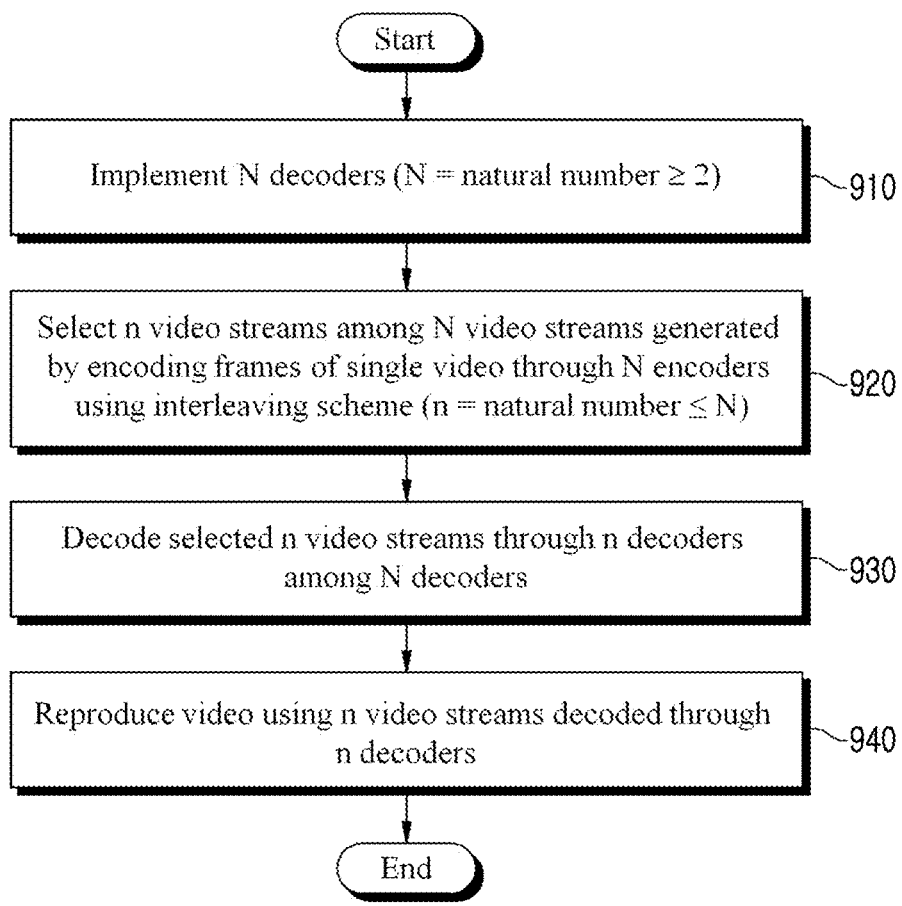
FIG. 9 is a flowchart illustrating an example of a video reproduction method according to at least one example embodiment.

FIG. 9 is a flowchart illustrating an example of a video reproduction method according to at least one example embodiment. The video reproduction method according to at least one example embodiment may be performed by the computer apparatus 200 that implements the receiver terminal 470. For example, the processor 220 of the computer apparatus 200 may be configured to execute a control instruction according to a code of at least one program or a code of an OS included in the memory 210. For example, the program code may be a code of an application installed on the receiver terminal 470 for linkage to a service for video reproduction. Here, the processor 220 may control the computer apparatus 200 to perform operations 910 to 940 included in the video reproduction method of FIG. 9 in response to a control instruction provided from a code stored in the computer apparatus 200.

Referring to FIG. 9, in operation 910, the computer apparatus 200 may implement N decoders. Here, N denotes a natural number greater than or equal to 2. Here, a value of N may be determined based on a value of N transferred from the sender terminal 410 through the server 460 and each of the N decoders may be implemented in the form of a software module under control of an application installed and executed on the computer apparatus 200. In this case, the computer apparatus 200 may include a single main decoder configured to decode a video and an audio by including a video decoder and an audio decoder, and N-1 sub decoders configured to decode a video by including a video decoder.

In operation 920, the computer apparatus 200 may select n video streams from among N video streams generated by encoding frames of a single video through N encoders using an interleaving scheme. According to at least one example embodiment, the frames of the single video are thus distributed among the N video streams based on the interleaving scheme. Here, n denotes a natural number less than or equal to N. For example, the computer apparatus 200 may determine n, that is a number of video streams used for reproduction of the video, based on a network situation and may select the determined n video streams. The computer apparatus 200 may dynamically adjust a number of video streams decoded for reproduction of the video by dynamically changing a value of n in response to a change in the network situation. Here, the N video streams may include a single video stream encoded through a single main encoder configured to encode a video and an audio, by including a video encoder and an audio encoder at the sender terminal 410, and N-1 video streams encoded through N-1 sub encoders configured to encode a video by including a video encoder at the sender terminal 410. The N video streams may be generated by the sender terminal 410 and transmitted to the server 460, and the computer apparatus 200 may receive n video streams among the N video streams through the server 460. That is, the receiver terminal 470, that is, the computer apparatus 200 may selectively receive the n video streams among the N video streams based on a network status and thus, may reduce restrictions according to the network status.

In operation 930, the computer apparatus 200 may decode the selected n video streams through n decoders among the N decoders. Here, the computer apparatus 200 may decode each of a single video stream encoded through the main encoder and n-1 video streams among the N-1 video streams encoded through sub encoders. An example in which, if N=3 and n=2, the receiver terminal 470 decodes a total of two video streams that includes a single video stream encoded through the main encoder and a single video stream encoded through a sub encoder among three video streams is described above with reference to FIG. 6.

In operation 940, the computer apparatus 200 may reproduce the video using the n video streams decoded through the n decoders. For example, the computer apparatus 200 may reproduce the video using a single screen by multiplexing the n video streams decoded through the n decoders based on PTS information included in the n video streams. For example, each of the decoded video frames may include PTS information and the computer apparatus 200 may align the decoded video frames within a buffer based on the PTS information. The aligned video frames may be used to reproduce the video at the computer apparatus 200. Here, in the case of using a value of n less than N, the same effect as or a similar effect to a substantial decrease in a bitrate may occur. Therefore, the receiver terminal 470, that is, the computer apparatus 200 may dynamically control the bitrate based on a network status.

As described above, according to at least one example embodiment, a sender may divide and thereby transmit a single video using N channels instead of using a single channel. Here, N denotes a natural number greater than or equal to 2. Also, according to at least one example embodiment, a receiver may reproduce a video of a bitrate suitable for a network environment of a receiver side by combining and thereby reproducing video streams received through n channels among N channels transmitted from a sender based on the network environment. Here, n denotes a natural number less than or equal to N.

According to at least one example embodiment, operations described herein as being performed by the computer apparatus 200, the sender terminal 410, the first encoder 430, the second encoder 440, the third encoder 450, the video encoder 431, the audio encoder 432, the formatter 433, the video encoder 441, the formatter 442, the video encoder 451, the formatter 452, the server 460, the receiver terminal 470, the first decoder 510, the second decoder 520, the third decoder 530, the demultiplexer 511, the video decoder 512, the audio decoder 513, the demultiplexer 521, the video decoder 522, the demultiplexer 531 and/or the video decoder 532 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Conventional apparatuses for transmitting video take one of two approaches: transcoding the video into several videos of varying quality, or transmitting the video at only a broadcast bitrate. However, transcoding results in excessive resource consumption (e.g., power, processor time and/or cycles, memory, etc.). Also, transmitting the video at only the broadcast bitrate results in delay and low quality of service in poor network environments because a receiver is only able to reproduce the video by receiving data at the broadcast bitrate.

In contrast, according to at least one example embodiment, devices and methods are provided for transferring frames of a video to a plurality of encoders for generating a plurality of independent streams. Accordingly, a receiver of the plurality of independent streams may decode a selected subset of the plurality of independent streams according to a current network environment. Thus, the devices and methods according to at least one example embodiment provide for a receiver that is able to adjust a quality level of a received video without performing transcoding. Therefore, the devices and methods according to at least one example embodiment overcome the deficiencies of the conventional apparatuses by avoiding or reducing delay and/or low quality of service in poor network environments without the excessive resource consumption (e.g., power, processor time and/or cycles, memory, etc.) involved in transcoding.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently, or collectively, instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to at least one example embodiment may be configured in a form of program instructions performed through various computer devices and recorded in non-transitory computer-readable media. The media may also include, alone or in combination with the program instructions, data files, data structures, and the like. The program instructions recorded in the media may be specially designed for at least one example embodiment or may be known to those skilled in the computer software art to be available. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. The media may include various recording media or storage media in which a single or a plurality of pieces of hardware are combined and may be distributed over a network without being limited to media directly connected to a computer system. Examples of program instructions include both machine code, such as produced by a compiler, and files containing higher level code that may be executed by the computer using an interpreter.

While this disclosure includes at least one example embodiment, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A non-transitory computer-readable record medium storing instructions that, when executed by processing circuitry, cause the processing circuitry to perform a video transmission method, the video transmission method comprising:
    transferring frames of a video to N encoders using an interleaving scheme, N denoting a first natural number greater than or equal to 2;
    generating N video streams by encoding the frames using the N encoders, each of the N video streams corresponding to one of the N encoders; and
    transmitting the N video streams and the first natural number denoted by N, each of the N video streams being transmitted as an independent stream.

2. The non-transitory computer-readable record medium of claim 1, wherein the N encoders comprise a single main encoder and N-1 sub encoders, the single main encoder configured to encode the video and an audio using a first video encoder and an audio encoder, and each of the N-1 sub encoders configured to encode the video using a second video encoder.

3. The non-transitory computer-readable record medium of claim 1, wherein the transferring the frames transfers an i-th frame of the video to an (((i-1) mod N)+1)-th encoder among the N encoders, i denoting a second natural number.

4. The non-transitory computer-readable record medium of claim 1, wherein the video transmission method further comprises:
    setting a first key frame period of each of the N encoders to be N times a second key frame period, the second key frame period being one used by a single encoder to encode the frames, and each of the first key frame period and the second key frame period corresponding to a respective I-frame period.

5. The non-transitory computer-readable record medium of claim 4, wherein
    the N encoders comprise a single main encoder and N-1 sub encoders, the single main encoder configured to encode the video and an audio using a first video encoder and an audio encoder, and each of the N-1 sub encoders configured to encode the video using a second video encoder; and
    the video transmission method further comprises sequentially activating the N-1 sub encoders based on a period corresponding to a ratio of the first key frame period to N.

6. The non-transitory computer-readable record medium of claim 1, wherein
    the transmitting includes transmitting the N video streams and the first natural number denoted by N to a receiver terminal via a server.

7. The non-transitory computer-readable record medium of claim 1, wherein
    the transmitting includes transmitting each of the N video streams to a receiver terminal as an independent stream, the receiver terminal configured to select n video streams among the N video streams based on a network situation, the receiver terminal configured to reproduce the video by decoding the n video streams, n denoting a third natural number less than or equal to N.

8. The non-transitory computer-readable record medium of claim 7, wherein the receiver terminal is configured to dynamically change a value of n in response to a change in the network situation.

9. A non-transitory computer-readable record medium storing instructions that, when executed by processing circuitry, cause the processing circuitry to perform a video reproduction method, the video reproduction method comprising:
    receiving N video streams and a first natural number denoted by N, the first natural number being greater than or equal to 2;
    implementing N decoders in response to the receiving the first natural number denoted by N;
    selecting n video streams from among the N video streams, frames of a single video being distributed among the N video streams based on an interleaving scheme, n denoting a second natural number less than or equal to N;
    decoding the n video streams using n decoders among the N decoders to obtain n decoded video streams; and
    reproducing the single video using the n decoded video streams.

10. The non-transitory computer-readable record medium of claim 9, wherein the selecting selects the n video streams based on a network situation.

11. The non-transitory computer-readable record medium of claim 10, wherein the video reproduction method further comprises:
    dynamically changing a value of n in response to a change in the network situation.

12. The non-transitory computer-readable record medium of claim 9, wherein the N video streams comprise a single video stream and N-1 video streams, the N video streams being encoded through a single main encoder including a first video encoder and an audio encoder configured to encode the single video and an audio, the N-1 video streams being encoded through N-1 sub encoders including a second video encoder configured to encode the single video, and the single main encoder and the N-1 sub encoders being included in a terminal of a sender.

13. The non-transitory computer-readable record medium of claim 12, wherein the decoding decodes the single video stream and n-1 video streams among the N-1 video streams.

14. The non-transitory computer-readable record medium of claim 9, wherein the reproducing comprises multiplexing the n video streams using presentation timestamp (PTS) information included in the n video streams, the single video being reproduced through a single screen.

15. The non-transitory computer-readable record medium of claim 9, further comprising:

the receiving includes receiving the N video streams and the first natural number denoted by N from a terminal of a sender via a server, the N video streams being generated at the terminal.

16. A video transmission method comprising:

transferring frames of a video to N encoders using an interleaving scheme, N denoting a first natural number greater than or equal to 2;

generating N video streams by encoding the frames using the N encoders, each of the N video streams corresponding to one of the N encoders; and transmitting the N video streams and the first natural number denoted by N, each of the N video streams being transmitted as an independent stream.

17. The video transmission method of claim 16, wherein the N encoders comprise a single main encoder and N-1 sub encoders, the single main encoder configured to encode the video and an audio using a first video encoder and an audio encoder, and each of the N-1 sub encoders configured to encode the video using a second video encoder.

18. The video transmission method of claim 16, wherein the transferring the frames transfers an i-th frame of the video to an (((i-1) mod N)+1)-th encoder, i denoting a second natural number.

19. The video transmission method of claim 16, further comprising:

setting a first key frame period of each of the N encoders to be N times a second key frame period, the second key frame period being one used by a single encoder to encode the frames, and each of the first key frame period and the second key frame period corresponding to a respective I-frame period.

20. A non-transitory computer-readable record medium storing instructions that, when executed by a processor, cause the processor to implement the video transmission method of claim 16.

* * * * *